United States Patent
Kodama et al.

(10) Patent No.: US 9,276,876 B2
(45) Date of Patent: Mar. 1, 2016

(54) DATA TRANSFER APPARATUS AND DATA TRANSFER METHOD

(71) Applicant: ALAXALA Networks Corporation, Kanagawa (JP)

(72) Inventors: Yasuhiro Kodama, Kawasaki (JP); Shinichi Akahane, Kawasaki (JP); Kazuo Sugai, Kawasaki (JP); Takao Nara, Yokohama (JP)

(73) Assignee: ALAXALA NETWORKS CORPORATION, Kanagawa (JP)

( * ) Notice: Subject to any disclaimer, the term of this patent is extended or adjusted under 35 U.S.C. 154(b) by 265 days.

(21) Appl. No.: 14/096,439

(22) Filed: Dec. 4, 2013

(65) Prior Publication Data
US 2014/0207897 A1    Jul. 24, 2014

(30) Foreign Application Priority Data
Jan. 23, 2013    (JP) ................................. 2013-009815

(51) Int. Cl.
*G06F 15/167*    (2006.01)
*H04L 12/933*    (2013.01)
*H04L 12/741*    (2013.01)

(52) U.S. Cl.
CPC .............. *H04L 49/10* (2013.01); *H04L 45/745* (2013.01)

(58) Field of Classification Search
CPC ....... H04L 12/56; H04L 49/10; H04L 12/701; H04L 45/745; H04L 29/08
USPC .......................................... 709/213; 370/392
See application file for complete search history.

(56) References Cited

U.S. PATENT DOCUMENTS

| | | | | |
|---|---|---|---|---|
| 8,738,917 B2* | 5/2014 | Wakao | ............... | H04N 1/32101 713/176 |
| 8,832,795 B2* | 9/2014 | Dowds | .............. | G06F 17/30867 713/193 |
| 2005/0074009 A1* | 4/2005 | Kanetake | .............. | H04L 49/552 370/392 |
| 2007/0160052 A1* | 7/2007 | Okada | ................... | H04L 45/742 370/392 |

FOREIGN PATENT DOCUMENTS

JP    2005-11717 A    4/2005

* cited by examiner

*Primary Examiner* — Frantz Jean
(74) *Attorney, Agent, or Firm* — Mattingly & Malur, PC

(57) ABSTRACT

A data transfer apparatus includes a first memory, a second memory, a search unit, and a data transmitting/receiving unit. The first memory holds information that associates a search key with an address. The second memory holds information that associates the address with verification information which is generated by a predetermined generation method based on at least a portion of the search key. The search unit generates the search key based on the received data, obtains, from the first memory, the address that is associated with the generated search key, obtains, from the second memory, the verification information that is associated with the obtained address, and verifies the verification information that is generated by the predetermined generation method based on at least a portion of the generated search key with the verification information obtained from the second memory. The data transmitting/receiving unit executes processing based on a result of the verification.

12 Claims, 8 Drawing Sheets

FIG. 3

SEARCH TABLE 138

CAM SEARCH KEY 303

| | N | N-1 | N-2 | ... | 4 | 3 | 2 | 1 | 0 |
|---|---|---|---|---|---|---|---|---|---|
| | 0 | 0 | 0 | | 0 | 0 | 0 | 1 | 1 |

↓ SEARCH

| DATABASE ENTRY | N | N-1 | N-2 | ... | 4 | 3 | 2 | 1 | 0 |
|---|---|---|---|---|---|---|---|---|---|
| 0 × 0000 | 0 | 0 | 0 | | 0 | 0 | 0 | 0 | 1 |
| 0 × 0001 | 0 | 0 | 0 | | 0 | 0 | 0 | 1 | 0 |
| 0 × 0002 | 0 | 0 | 0 | | 0 | 0 | 0 | 1 | 1 |
| 0 × 0003 | 0 | 0 | 0 | | 0 | 0 | 1 | 0 | 0 |
| 0 × 0004 | 0 | 0 | 0 | | 0 | 0 | 1 | 0 | 1 |
| 0 × 0005 | 0 | 0 | 0 | | 0 | 0 | 1 | 1 | 0 |
| | | | | | | | | | |
| 0 × FFFF | * | * | * | | 1 | 1 | 1 | 1 | 1 |

FIG. 4

SEARCH INTERMEDIATE TABLE 206

| ADDRESS 401 | TABLE ADDRESS 402 |
|---|---|
| 0 × 0000 | 4 |
| 0 × 0001 | 5 |
| 0 × 0002 | 6 |
| 0 × 0003 | 6 |
| 0 × 0004 | 5 |
| 0 × 0005 | 4 |
| | |
| 0 × FFFF | M |

FIG. 5

DESTINATION TABLE 139

| ADDRESS (501) | OUTPUT INFORMATION (502) | VERIFICATION INFORMATION (503) |
|---|---|---|
| 0 × 0000 | OUTPUT #1 | A |
| 0 × 0001 | OUTPUT #2 | B |
| 0 × 0002 | OUTPUT #3 | C |
| 0 × 0003 | OUTPUT #4 | D |
| 0 × 0004 | OUTPUT #5 | E |
| 0 × 0005 | OUTPUT #6 | F |
| 0 × 0006 | OUTPUT #7 | G |
|  |  |  |

| NexthopIP (502A) | OUTPUT PORT (502B) | TRANSFER CONTROL INFORMATION (502C) |

FIG. 8

DESTINATION TABLE 139

| ADDRESS (801) | OUTPUT INFORMATION (802) | VLAN-ID (803) |
|---|---|---|
| 0 × 0000 | OUTPUT #1 | 0010 |
| 0 × 0001 | OUTPUT #2 | 0011 |
| 0 × 0002 | OUTPUT #3 | 0100 |
| 0 × 0003 | OUTPUT #4 | 0101 |
| 0 × 0004 | OUTPUT #5 | 0110 |
| 0 × 0005 | OUTPUT #6 | 0111 |
| 0 × 0006 | OUTPUT #7 | 1011 |
|  |  |  |

| OUTPUT PORT (802A) | TRANSFER CONTROL INFORMATION (802B) |
|---|---|

FIG. 9

FLOODING DESTINATION TABLE 900

| VLAN-ID (901) | OUTPUT PORT (902) | | | | | | | |
|---|---|---|---|---|---|---|---|---|
|  | 1 | 2 | 3 | 4 | 5 | 6 | 7 | 8 ... |
| ⋮ | ⋮ | ⋮ | ⋮ | ⋮ | ⋮ | ⋮ | ⋮ | ⋮ |
| 0110 | Port #1 | Port #3 | Port #5 | Port #7 | Port #8 | - | - | - |
| 0111 | Port #2 | Port #4 | Port #6 | - | - | - | - | - |
| 1011 | Port #9 | Port #10 | Port #11 | Port #12 | - | - | - | - |
| ⋮ | ⋮ | ⋮ | ⋮ | ⋮ | ⋮ | ⋮ | ⋮ | ⋮ |

DATA TRANSFER APPARATUS AND DATA TRANSFER METHOD

CLAIM OF PRIORITY

The present application claims priority from Japanese patent application JP2013-9815 filed on Jan. 23, 2013, the content of which is hereby incorporated by reference into this application.

BACKGROUND OF THE INVENTION

This invention relates to a data transfer apparatus.

Japanese Patent Application Laid-open No. 2005-117171 is given as background art of a technical field to which this invention belongs. Japanese Patent Application Laid-open No. 2005-117171 describes a packet transfer unit "including a search key storing part for storing a search key for the transfer destination of a packet and verification information generated from the search key in association with the storage location of transfer information stored in a transfer information storing part, and a transfer information obtaining part searches the search key storing part with the use of a search key generated based on the header information and with the use of verification information generated from the search key, obtains storage location information of transfer information from the search key storing part when the search key and the verification information match those stored in the search key storing part, and obtains transfer information stored in the transfer information storing part based on the obtained storage location information, and a transfer part transfers a packet based on the obtained transfer information".

SUMMARY OF THE INVENTION

A data transfer apparatus included in a network uses a content-addressable memory (CAM) in order to speed up a search for data transfer information (for example, information for determining a port from which data is output). When a soft error caused by radiation or the like occurs in a CAM, a search hits on a wrong CAM entry in some cases and wrong transfer information is obtained based on the wrong entry, with the result that data is transferred to a wrong transfer destination. Building a highly reliable network requires preventing such erroneous transfer. For instance, a data transfer apparatus that does not hit on a wrong entry, in other words, does not transfer data erroneously, in the event of soft error is realized by registering a search key and verification information that is generated from the search key in each CAM entry in advance, and executing a search with the use of the combination of a search key and verification information (Japanese Patent Application Laid-open No. 2005-117171).

The miniaturization of the CAM process in recent years has created a general increase in the rate of multi-bit soft errors. The detection of a multi-bit soft error requires securing verification information of a higher bit count than in the detection of a single-bit soft error. For instance, securing 1-bit parity is enough for the detection of a 1-bit error of 32-bit data, whereas a 7-bit error correcting code (ECC) needs to be secured in order to detect a 2-bit error of 32-bit data. On the other hand, the bit count of a search key itself registered in a CAM is on the rise in order to deal with an increase in the number of users accommodated. The rising bit counts of a search key and verification information that are registered in a CAM lead to problems such as deteriorated search performance and a reduction in entry count that can be accommodated.

In order to solve the foregoing problem, there is provided a data transfer apparatus coupled to a network, comprising: a first memory; a second memory; a search unit which is connected to the first memory and the second memory; and a data transmitting/receiving unit which is connected to the search unit to process data received from the network, wherein the first memory holds information that associates a search key with an address, wherein the second memory holds information that associates the address with verification information which is generated by a predetermined generation method based on at least a portion of the search key, wherein the search unit is configured to: generate the search key based on the received data; obtain, from the first memory, the address that is associated with the generated search key; obtain, from the second memory, the verification information that is associated with the obtained address; and verify the verification information that is generated by the predetermined generation method based on at least a portion of the generated search key with the verification information obtained from the second memory, and wherein the data transmitting/receiving unit executes processing based on a result of the verification.

According to one embodiment of this invention, erroneous data transfer due to an error in a CAM is prevented while keeping the search performance of the CAM from deteriorating, keeping the count of entries that can be accommodated from dropping, and keeping the cost from rising.

Other objects, configurations, and effects than those described above are made clear by the following description of embodiments.

BRIEF DESCRIPTION OF THE DRAWINGS

FIG. 3 is an explanatory diagram of a search table that is kept by the switch 100 according to the first embodiment of this invention.

FIG. 4 is an explanatory diagram of a search intermediate table that is kept by the switch according to the first embodiment of this invention.

FIG. 5 is an explanatory diagram of a destination table that is kept by the switch according to the first embodiment of this invention.

FIG. 8 is an explanatory diagram of a destination table that is kept by the switch according to the second embodiment of this invention.

FIG. 9 is an explanatory diagram of a flooding destination table which is kept by the switch according to the second embodiment of this invention.

DETAILED DESCRIPTION OF THE PREFERRED EMBODIMENTS

Embodiments of this invention are described below with reference to the drawings.

First Embodiment

Figure 1:
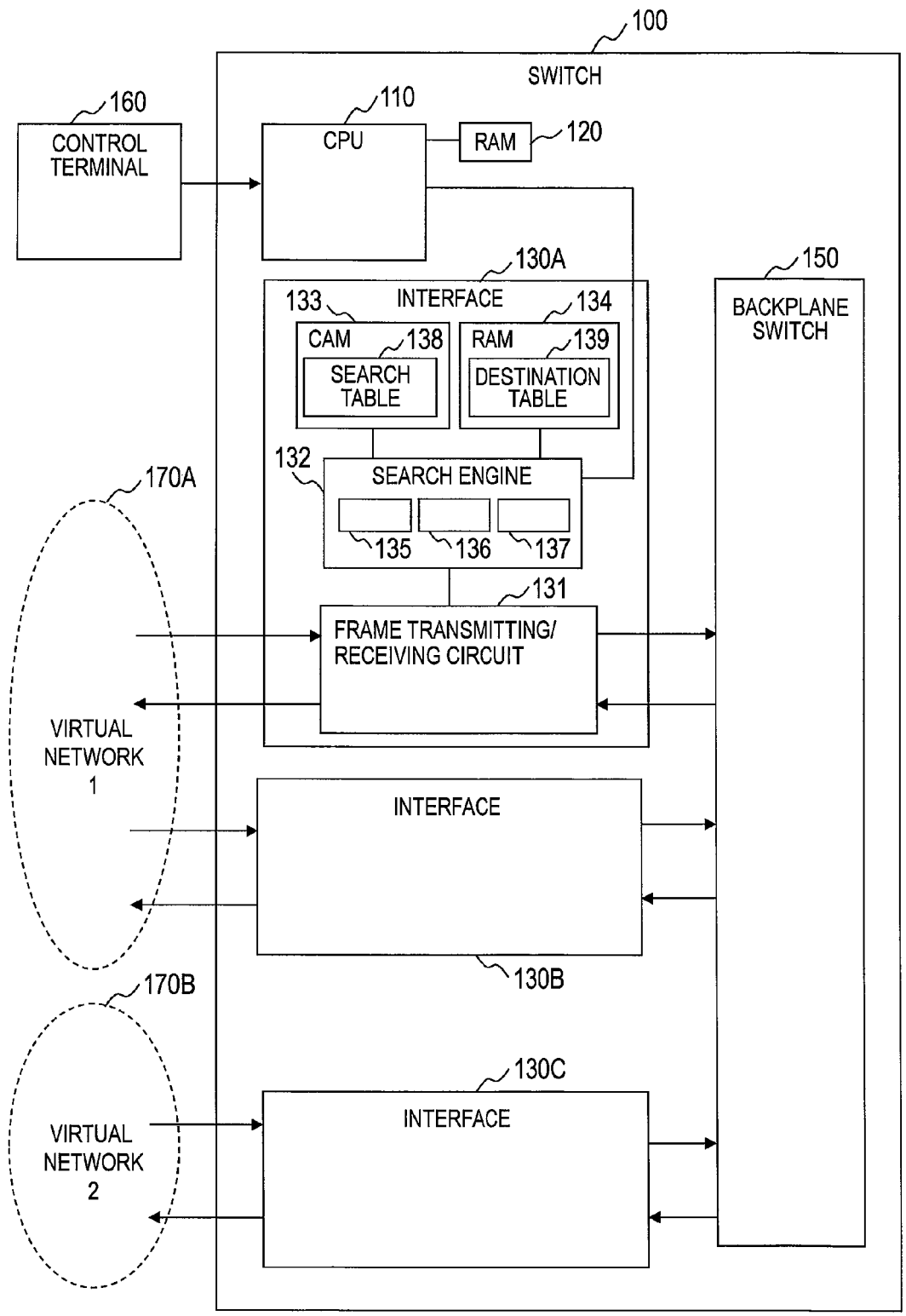
FIG. 1 is a block diagram illustrating the configuration of a switch according to a first embodiment of this invention.

FIG. 1 is a block diagram illustrating the configuration of a switch 100 according to a first embodiment of this invention.

The switch 100 in the first embodiment is a data transfer apparatus that is coupled to another switch (not shown), a gateway (not shown), a server (not shown), or the like to transfer received data based on data of the third layer (the network layer, hereinafter also referred to as L3) of the OSI Reference Model. The switch 100 includes a central processing unit (CPU) 110, a random access memory (RAM) 120, a plurality of interfaces 130, and a backplane switch 150, which are connected to one another.

The CPU 110 holds communication to/from a control terminal 160, and follows an instruction from the control terminal 160 in controlling the operation of the components of the switch 100, setting tables that are stored in respective memories, and the like.

The RAM 120 stores, among others, information referred to by the CPU 110 (for example, a master table which is described later).

While FIG. 1 illustrates interfaces 130A to 130C as an example of the plurality of interfaces 130, the switch 100 has an arbitrary number of interfaces 130. The interface 130A includes a frame transmitting/receiving circuit 131, a search engine 132, a CAM 133, and a RAM 134.

The frame transmitting/receiving circuit 131 is coupled to another switch, a gateway, a server, or the like that is outside the switch 100, and is connected to the backplane switch 150 inside the switch 100 to transmit/receive data to/from the external apparatus and the internal component.

The search engine 132 searches the CAM 133 and the RAM 134 for stored data based on L3 header information or the like of a frame which is received by the frame transmitting/receiving circuit 131, generates output information based on the result of the search, and notifies the frame transmitting/receiving circuit 131 of the output information. The frame transmitting/receiving circuit 131 transmits a frame based on the generated output information. Specifically, the search engine 132 includes a CAM search key generator 135, a verification information generator 136, a verification information determining controller 137, and others. Details of processing executed by these components are described later (illustrated in FIG. 6 and other drawings).

The CAM 133 and the RAM 134 store, among others, a search table 138 and a destination table 139, respectively. Details of the tables are described later (illustrated in FIG. 3, FIG. 5, and other drawings).

The configurations of the interfaces 130B and 130C are the same as that of the interface 130A, and the illustration and description thereof are therefore omitted. In the following description, the interfaces 130A to 130C are collectively referred to as interfaces 130 when there is no need to distinguish one from another, such as when the description being given applies to all of the interfaces 130A to 130C.

The backplane switch 150 enables the plurality of interfaces 130 to exchange frames in accordance with the result of a search by the search engine 132.

The frame transmitting/receiving circuit of each interface 130 is coupled to another switch or the like as described above. The switch 100 and a plurality of other switches or apparatus coupled to the switch 100 may constitute a single network physically. In this embodiment, however, a plurality of independent virtual networks, such as virtual private networks (VPNs), are set to the physical network. In the example of FIG. 1, a virtual network 1_170A and a virtual network 2_170B are set as the virtual networks. Of the plurality of interfaces 130 included in the switch 100, the interfaces 130A and 130B are used for communication of the virtual network 1_170A, and the interface 130C is used for communication of the virtual network 2_170B. These virtual networks can be of any type. To which virtual network a received frame belongs is identified in the first embodiment by a Virtual Routing and Forwarding identifier (VRF-ID) set to each interface.

Figure 2:
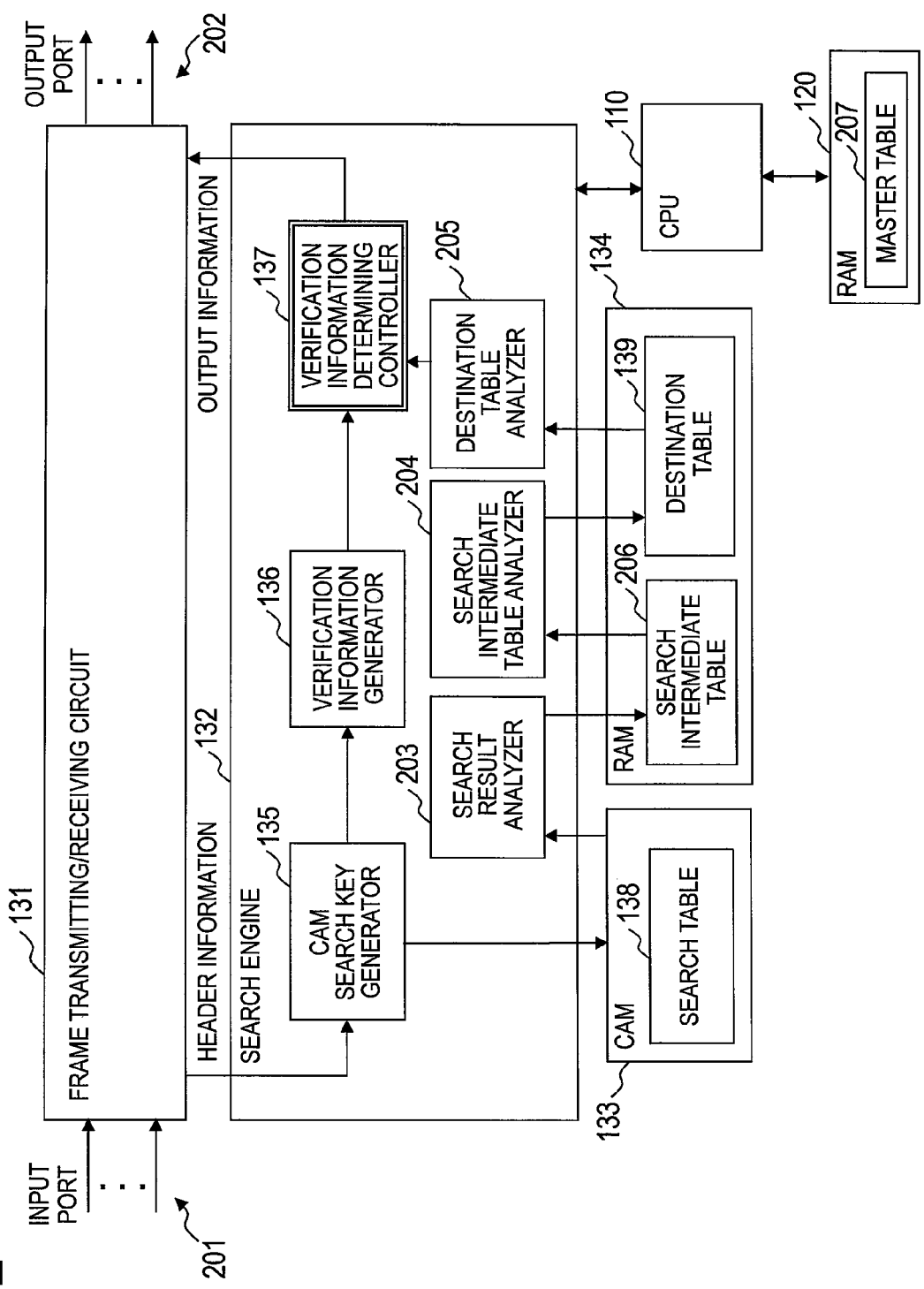
FIG. 2 is a block diagram illustrating a detailed configuration of interfaces that are included in the switch according to the first embodiment of this invention.

FIG. 2 is a block diagram illustrating a detailed configuration of the interfaces 103 that are included in the switch 100 according to the first embodiment of this invention.

The frame transmitting/receiving circuit 131 includes a plurality of input ports 201 for receiving a frame from another switch or other external apparatus, or from the backplane switch 150, and a plurality of output ports 202 for transmitting a frame to another switch or other external apparatus, or to the backplane switch 150. The frame transmitting/receiving circuit 131 notifies the search engine 132 of L3 header information or the like of a frame received from one of the input ports 201, and outputs a frame from one of the output ports 202 that is specified by output information notified of from the search engine 132.

The search engine 132 includes, in addition to the CAM search key generator 135, the verification information generator 136, and the verification information determining controller 137, a search result analyzer 203, a search intermediate table analyzer 204, and a destination table analyzer 205. Details of processing executed by these components are described later (illustrated in FIG. 6 and other drawings).

The RAM 134 stores a search intermediate table 206 in addition to the destination table 139. Details of the search intermediate table 206 are described later (illustrated in FIG. 4).

The RAM 120 stores a master table 207. The master table 207 is a table that contains information equivalent to that of the search table 138.

FIG. 3 is an explanatory diagram of the search table 138 that is kept by the switch 100 according to the first embodiment of this invention.

The search table 138 includes a plurality of combinations of a search key 301 and a database entry 302, which is an address associated with the search key 301. Each search key 301 is a string of a plurality of bits (N+1 bits in the example of FIG. 3). When a search key 303 of N+1 bits is input, the CAM 133 searches for the database entry 302 that is associated with the same search key 301 as the input search key 303, and outputs the found database entry 302 as a search result. The search key 303 to be input is, as described later, generated based on L3 header information of a frame which is received by the frame transmitting/receiving circuit 131. A search key in the first embodiment contains a VRF-ID and the destination Internet Protocol (IP) address of a frame in question.

A plurality of combinations of the search key 301 and the database entry 302 are registered in advance based on what is stored in the master table 207. The master table 207 stores information indicating the value of every search key 301 to be registered in the search table 138 and the value of the database entry 302 that is associated with the search key value. In the case where a soft error in the CAM 133 causes the search table 138 to contain erroneous information, the search table 138 can be restored to a correct state by referring to the master table 207.

FIG. 4 is an explanatory diagram of the search intermediate table 206 that is kept by the switch 100 according to the first embodiment of this invention.

The search intermediate table 206 includes a plurality of combinations of an address 401 and a table address 402. The address 401 corresponds to the database entry 302 of the search table 138, and the table address 402 corresponds to an address 501 of the destination table 139 which is described later. The search intermediate table 206 associates an entry of the search table 138 with an entry of the destination table 139.

FIG. 5 is an explanatory diagram of the destination table 139 that is kept by the switch 100 according to the first embodiment of this invention.

The destination table 139 includes a plurality of combinations of the address 501, output information 502, and verification information 503. The address 501 corresponds to the table address 402 of the search intermediate table 206. The output information 502 is information for controlling frame output and, in the example of FIG. 5, includes a nexthop IP 502A, which is the IP address of a next transfer destination switch of a frame in question, an output port 502B, which specifies the output port 202 that is to be used to output the frame, and transfer control information 502C, which includes, among others, a flag indicating whether or not the frame is to be discarded.

The verification information 503 is a check code generated for each search key 301 of the search table 138 by performing a predetermined calculation on a partial bit string of the search key 301 in order to detect an error in the bit string. In the first embodiment, the verification information 503 is generated for each search key 301 in order to detect an error in the VRF-ID that is included in the search key 301, and is registered in the destination table 139. While FIG. 5 illustrates values "A" to "G" as the verification information 503, the actual verification information 503 may be 1-bit parity for detecting a 1-bit error or a multi-bit ECC for detecting an error of 2 bits or of a higher bit count. The verification information 503 can be generated by any known method.

A concrete example of the tables illustrated in FIGS. 3 to 5 is described. In the example, "0x0002" is registered as the value of the database entry 302 that is associated with a value "000•••00011" of the search key 301 in the search table 138, "6" is registered as the value of the table address 402 that is associated with a value "0x0002" of the address 401 in the search intermediate table 206, and "G" is registered as the value of the verification information 503 that is associated with a value "0x0006" of the address 501 in the destination table 139. When a search key "000•••00011" is input to the CAM 133 in this case, "G" is ultimately obtained as verification information as described later in detail (illustrated in FIG. 6).

A value "0x0003" is registered as the database entry 302 that is associated with a value "000•••00100" of the search key 301 in the search table 138, and "6" is registered as the value of the table address 402 that is associated with a value "0x0003" of the address 401 in the search intermediate table 206. Accordingly, a table address "6" which is associated with an address "0x0003" is obtained from the search intermediate table 206 and the verification information "G" which is associated with an address "0x0006" is obtained from the destination table 139 also when a search key "000•••00100" is input to the CAM 133. This means that, because the different values of the search key 301, "000•••00011" and "000•••00100", contain the same VRF-ID, the same verification information "G" is generated from these search keys.

The first embodiment deals with an example in which a check code generated from a VRF-ID through a predetermined calculation is used as verification information as described above. Alternatively, a VRF-ID extracted from a search key may be used as verification information without modification as in a second embodiment of this invention described later.

Verification information, which is conventionally included in the search table 138 inside the CAM 133 as described in Japanese Patent Application Laid-open No. 2005-117171, is included in the destination table 139 inside the RAM 134 in this embodiment as described above. The CAM 133 therefore does not need to store verification information and the storage capacity of the CAM which is high in per-bit price can thus be utilized to the fullest. In other words, according to this embodiment where an increase in the bit count of verification information does not increase the CAM-related cost, the bit count of verification information can be increased as necessary without raising the cost even when the bit count of an error in the CAM increases due to, for example, process miniaturization. CAM error detection performance is thus improved and erroneous frame transfer is prevented.

In addition, when the same verification information is generated from two different search keys in this embodiment, the verification information associated with the two search keys can be kept in one integrated entry by associating two entries of the search table 138 with one entry of the destination table 139 via the search intermediate table 206 in the manner described above. When the same verification information is generated from three or more search keys, too, the verification information is similarly integrated in one entry of the destination table 139. The storage capacity of the RAM is thus utilized to the fullest as well.

Figure 6:
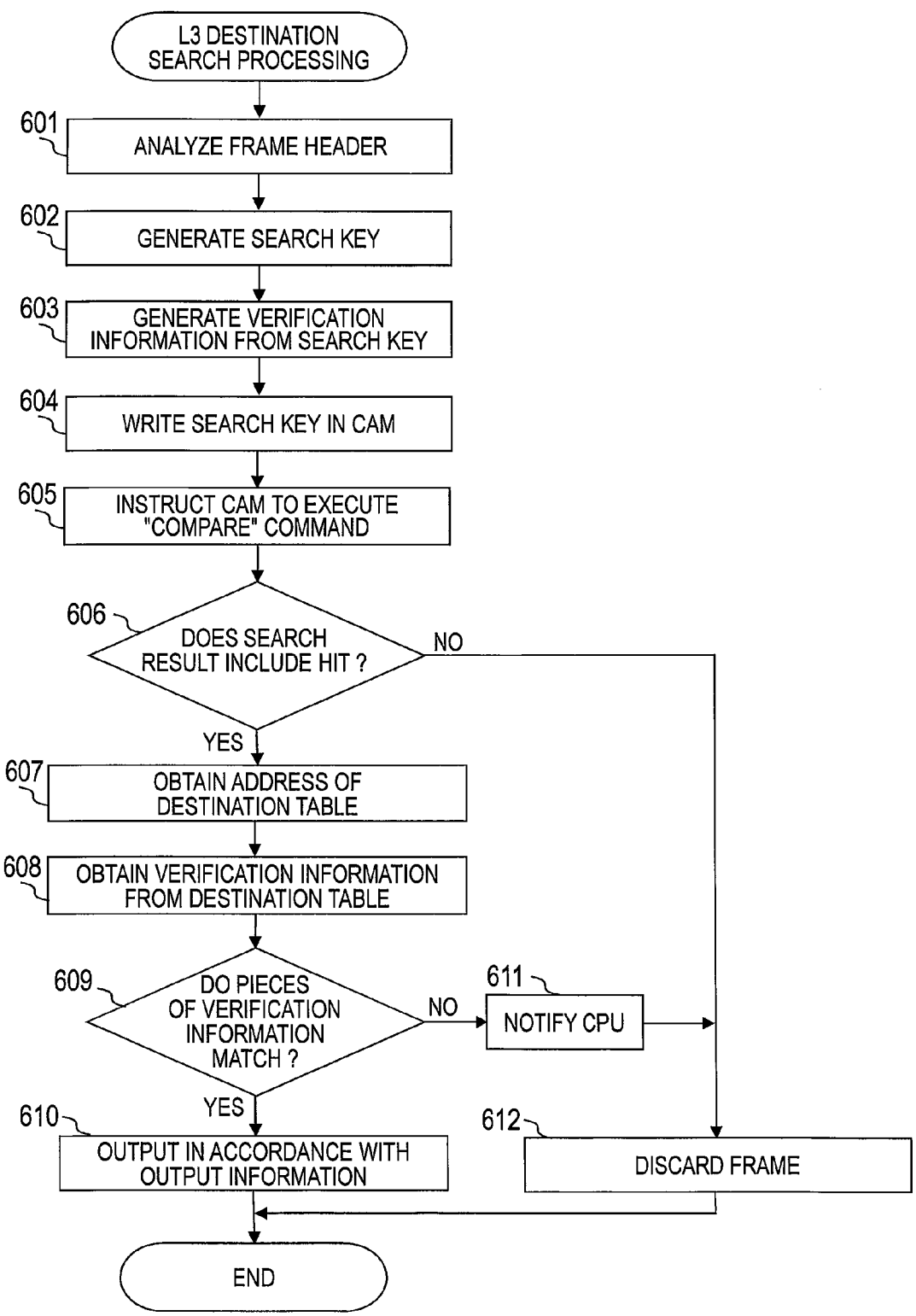
FIG. 6 is a flow chart illustrating L3 destination search processing which is executed by a search engine of the switch according to the first embodiment of this invention.

FIG. 6 is a flow chart illustrating L3 destination search processing which is executed by the search engine 132 of the switch 100 according to the first embodiment of this invention.

The frame transmitting/receiving circuit 131 receives a frame from one of the input ports 201 and outputs L3 header information of the frame to the search engine 132. The search engine 132 analyzes the header information input from the frame transmitting/receiving circuit 131 (Step 601). Specifically, the search engine 132 performs such processing as determining whether or not the input header information is processable by the search engine 132. The search engine 132 discards the header information when the header information is not processable, and inputs the header information to the CAM search key generator 135 when the header information is processable.

The CAM search key generator 135 generates a search key for searching the CAM 133 from the input header information (Step 602). The CAM search key generator 135 in the first embodiment generates a search key containing a VRF-ID and a destination IP address that are obtained from the input header information.

Next, the verification information generator 136 generates verification information from the search key generated in Step 602 (Step 603). The verification information generator 136 in the first embodiment generates verification information by performing the same predetermined calculation that is used to generate the verification information 503 on the VFR-ID obtained from the input search key.

The CAM search key generator 135 writes the search key generated in Step 602 in the CAM 133 (Step 604). The search key 303 of FIG. 3 is an example of the search key written in Step 604.

Next, the search engine 132 transmits a "compare" command to the CAM 133, which uses the search key 303 to search the search table 138 (Step 605). Specifically, the CAM 133 searches for an entry that contains the same search key 301 as the written search key 303, and obtains the value of the database entry 302 of a hit entry as a search result.

Next, the search result analyzer 203 determines whether or not the search in Step 605 has hit on any entry of the search table 138 (Step 606). In the case where the search has hit on any entry, the search intermediate table analyzer 204 searches the search intermediate table 206 by using, as a search key, the value of the database entry 302 that has been obtained as a search result, and obtains an address of the destination table 139 (namely, the table address 402) (Step 607). The destination table analyzer 205 then searches the destination table 139 with the address obtained in Step 607 as a search key, and obtains the verification information 503 of a hit entry (Step 608).

Next, the verification information determining controller 137 determines whether or not the verification information 503 obtained in Step 608 matches the verification information generated in Step 603 (Step 609). When these pieces of verification information match, it is determined that an error has not occurred in at least the VRF-ID section of the search key 301 of the entry hit in the search of Step 605. The verification information determining controller 137 therefore inputs to the frame transmitting/receiving circuit 131 the output information 502 that is obtained from the entry hit in Step 608, and the frame transmitting/receiving circuit 131 processes the frame in accordance with the output information input thereto (Step 610). Specifically, in the case where the output information 502 specifies one of the output ports 202, the frame transmitting/receiving circuit 131 outputs the frame from the specified output port 202.

When it is determined in Step 609 that the pieces of verification information do not match, it means that an error has occurred in the VRF-ID section of the search key 301 of the entry hit in the search of Step 605. In other words, if the frame is transmitted in accordance with the output information 502 that is obtained based on this search result, the frame arrives at a virtual network that is not the intended transmission destination, thereby giving rise to a security problem. The interface 130 therefore discards the frame (Step 612). For instance, the search engine 132 transmits to the frame transmitting/receiving circuit 131 output information that contains information indicating that the frame is to be discarded, and the frame transmitting/receiving circuit 131 discards the frame in accordance with this output information.

The interface 130 discards the frame also when it is determined in Step 606 that the search has not hit on any entry (Step 612).

When it is determined in Step 609 that the pieces of verification information do not match, the search engine 132 may notify the CPU 110 of the fact (Step 611). The CPU 110 may search the master table 207 based on the notified information to notify the search engine 132 of the correct value of the database entry. The search engine 132 in this case can use the notified database entry value to execute Step 607 and subsequent steps instead of executing Step 612. However, because the master table 207 is stored in a normal RAM instead of a CAM, obtaining the value of a database entry from the CPU takes longer than obtaining the value of a database entry through a search of the search table 138.

Alternatively, the CPU 110 may identify an entry of the search table 138 where an error has occurred based on the notified information, and notify the search engine 132 of correct information to be stored in the entry so that the search engine 132 can repair the search table 138 based on the notified information. The search engine 132 in this case may execute Step 612 after executing step 611 without waiting for the completion of the repair of the search table 138, or may execute Step 605 and subsequent steps, instead of executing Step 612, after the search table 138 is repaired.

A concrete example of the L3 destination search processing is described with reference to FIGS. 3 to 6. In the case where "000 • • • 00011" is generated as a search key in Step 602 and is written as the search key 303 in Step 604, a value "0x0002" of the database entry 302 that is associated with a value "000 • • • 00011" of the search key 301 is obtained as a result of the execution of a "compare" command (Step 605) by the CAM 133. A value "6" of the table address 402 that is associated with a value "0x0002" of the address 401 is then obtained from the search intermediate table 206 (Step 607). A value "output #7" of the output information 502 and a value "G" of the verification information 503 that are associated with a value "0x0006" of the address 501 are obtained from the destination table 139 (Step 608). Because no error has occurred in the CAM 133 in this example, the verification information "G" matches verification information generated in Step 603 (Step 609), and the frame is output in accordance with the output information "output #7" (Step 610).

The search table 138 illustrated in FIG. 3 is one where no error has occurred. Now, a description is given on L3 destination search processing that is executed when an error in which the least significant bit is inverted turns a value "000 . . . 00010" of the search key 301 that is associated with a database entry value "0x0001" into "000 • • • 00011". In this case, a value "0x0001" of the database entry 302 that is associated with a value "000• • • 00011" of the search key 301 is erroneously obtained as a result of executing the "compare" command (Step 605). Consequently, a value "5" of the table address 402 that is associated with a value "0x0001" of the address 401 is obtained from the search intermediate table 206 (Step 607), and a value "output #6" of the output information 502 and a value "F" of the verification information 503 that are associated with a value "0x0005" of the address 501 are obtained from the destination table 139 (Step 608). The verification information "F" does not match the verification information "G" generated in Step 603 (Step 609), and the frame is therefore discarded (Step 612).

When the search engine 132 notifies the CPU 110 of the mismatch of verification information (Step 611) and the notification includes a value "000 • • • 00011" of the search key 303, the CPU 110 can search the master table 207 to obtain "0x0002", which is the correct database entry value associated with this search key 303, and notify the search engine 132 of the obtained value. The search engine 132 executes Step 607 and subsequent steps with the use of the notified database entry value "0x0002".

When the notification from the search engine 132 includes an erroneous search result "0x0001" instead, the CPU 110 can search the master table 207 to obtain "000 • • • 00010", which is the correct search key value that is associated with the database entry value "0x0001", and notify the search engine 132 of the obtained value. The search engine 132 repairs the value of the search key 301 in an entry of the search table 138 where an error has occurred with the notified search key value "000 • • • 00010".

In the case where an error does not occur in the search key "000 • • • 00010" associated with the database entry "0x0001" and occurs in the least significant bit of the search key "000 • • • 00011" associated with the database entry "0x0002" (in short, when this search key is turned into "000 • • • 00010"), on the other hand, it is determined in Step 606 that the search has not hit on any entry, and the frame is discarded in Step 612. The CPU 110 executes a patrol of the search table 138 at a predetermined timing in this manner in order to repair an error that cannot be found with the use of verification information.

Specifically, at a predetermined time or regularly, or when a predetermined event (e.g., the issuing of an execution instruction from the control terminal 160) is detected, the CPU 110 conducts a check for determining, for each entry of the search table 138, whether or not the entry's combination of the search key 301 and the database entry 302 matches a combination registered in the master table 207. When the entry's combination does not match, the entry of the search table 138 is repaired so as to match the registered combination. For example, in the case where a patrol is executed regularly, all entries of the search table 138 may be checked in one patrol, or only some entries may be checked in one patrol, with some other entries checked in the next patrol and the remaining entries checked in order in the subsequent patrols.

According to the first embodiment of this invention described above, verification information is stored in the RAM 134 instead of the CAM 133. Satisfactory error detection performance is thus accomplished in terms of errors in the CAM 133 without increasing the cost, and erroneous frame transfer is prevented as a result. In addition, because an error check that uses verification information is conducted by the search engine 132 instead of the CAM 133, erroneous transfer due to a hardware failure of the search function in the CAM 133 is prevented as well.

Second Embodiment

The second embodiment of this invention is described below with reference to the drawings. Except for differences described below, the components of the switch 100 according to the second embodiment have the same functions as the components of the first embodiment that are illustrated in FIGS. 1 and 2 and denoted by the same reference symbols. Descriptions thereof are therefore omitted here.

The switch 100 of the second embodiment of this invention is a data transfer apparatus that transfers received data based on data of the second layer (the data link layer, hereinafter also referred to as L2) of the OSI Reference Model. The RAM 134 of the switch 100 of the second embodiment stores a flooding destination table 900 in addition to the destination table 139 and the search intermediate table 206. The virtual network 1_170A and the virtual network 2_170B in the second embodiment are identified by virtual local area network identifiers (VLAN-IDs).

Figure 7:
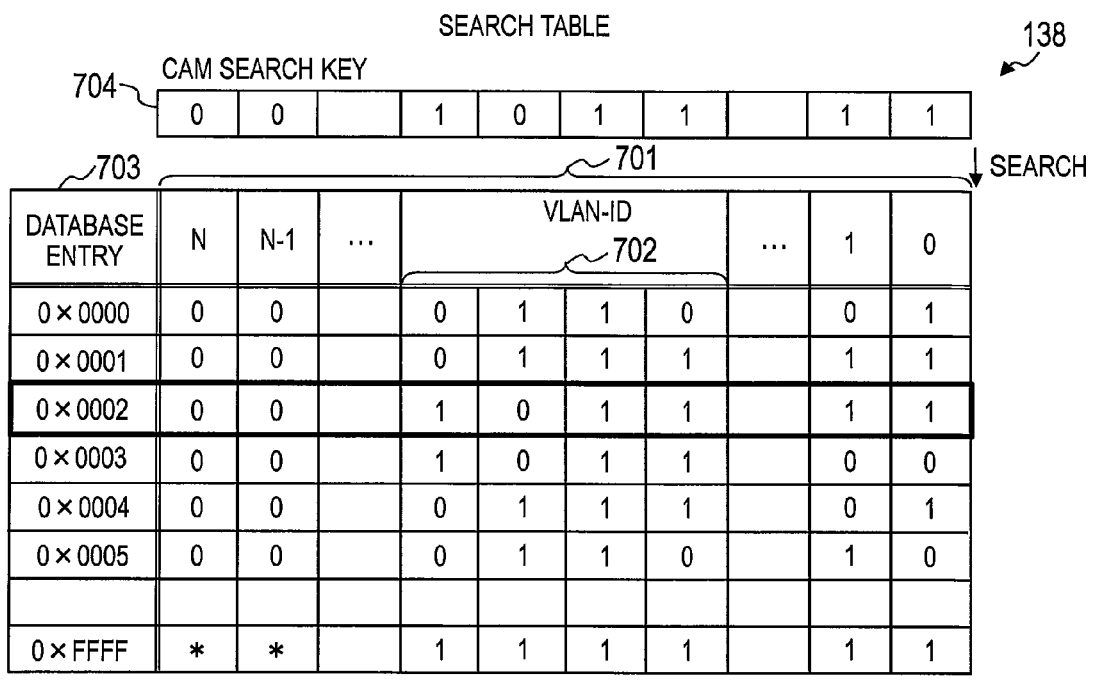
FIG. 7 is an explanatory diagram of a search table that is kept by a switch according to a second embodiment of this invention.

FIG. 7 is an explanatory diagram of the search table 138 that is kept by the switch 100 according to the second embodiment of this invention.

The search table 138 of the second embodiment includes a plurality of combinations of a search key 701 and a database entry 703 which is an address associated with the search key 701. Each search key 701 is a string of a plurality of bits (N+1 bits in the example of FIG. 7). When a search key 704 of N+1 bits is input, the CAM 133 searches for the database entry 703 that is associated with the same search key 701 as the input search key 704, and outputs the found database entry 703 as a search result. As in the first embodiment, the search key 704 to be input is generated based on header information of a frame which is received by the frame transmitting/receiving circuit 131. However, because header information referred to in the second embodiment is that of L2, a search key in the second embodiment contains a VLAN-ID 702 and the destination Media Access Control (MAC) address of a frame in question, instead of a VRF-ID and others contained in a search key of the first embodiment.

A plurality of combinations of the search key 701 and the database entry 703 are registered in advance based on what is stored in the master table 207. The master table 207 stores information indicating the value of every search key 701 to be registered in the search table 138 and the value of the database entry 703 that is associated with the search key value. In the case where a soft error in the CAM 133 causes the search table 138 to contain erroneous information, the search table 138 can be restored to a correct state by referring to the master table 207.

The search intermediate table 206 of the second embodiment is the same as that of the first embodiment (illustrated in FIG. 4).

FIG. 8 is an explanatory diagram of the destination table 139 that is kept by the switch 100 according to the second embodiment of this invention.

The destination table 139 includes a plurality of combinations of an address 801, output information 802, and a VLAN-ID 803. The address 801 corresponds to the table address 402 of the search intermediate table 206. The output information 802 is information for controlling frame output and, in the example of FIG. 8, includes an output port 802A, which specifies the output port 202 that is to be used to output the frame, and transfer control information 802B, which includes, among others, a flag indicating whether or not the frame is to be discarded.

The VLAN-ID 803 corresponds to the VLAN-ID 702 contained in each search key 701 of the search table 138. The second embodiment uses the VLAN-ID 803 in place of the verification information 503 used in the first embodiment. In other words, the second embodiment uses the VLAN-ID 803 as verification information. Alternatively, a check code generated by a predetermined calculation from the VLAN-ID 702 contained in each search key 701 may be used as verification information in place of the VLAN-ID 803 as in the first embodiment.

FIG. 9 is an explanatory diagram of the flooding destination table 900 which is kept by the switch 100 according to the second embodiment of this invention.

The flooding destination table 900 is a table referred to in order to determine the output port 202 from which a frame is to be output when the frame is broadcast as described later. The flooding destination table 900 includes a plurality of combinations of a VLAN-ID 901 and an output port 902. The VLAN-ID 901 is the identifier of a virtual network, and corresponds to the VLAN-ID 702 of the search table 138 and the VLAN-ID 803 of the destination table 139. The output port 902 is a list of the identifiers of one or more output ports 202 that are associated with a VLAN-ID in question.

For example, "port #9", "port #10", "port #11", and "port #12" are registered in FIG. 9 as values of the output port 902 that are associated with a value "1011" of the VLAN-ID 901. This means that frames transmitted from four output ports 202 that are identified by these four identifiers arrive at a VLAN that is identified by the VLAN-ID "1011", and do not arrive at other VLANs. The identifiers of all output ports 202 from which frames are transmitted to arrive at a VLAN identified by the VLAN-ID "1011" are registered as values of the output port 902 that are associated with the value "1011" of the VLAN-ID 901. The same applies to the output ports 902 that are associated with other values of the VLAN-ID 901.

Figure 10:
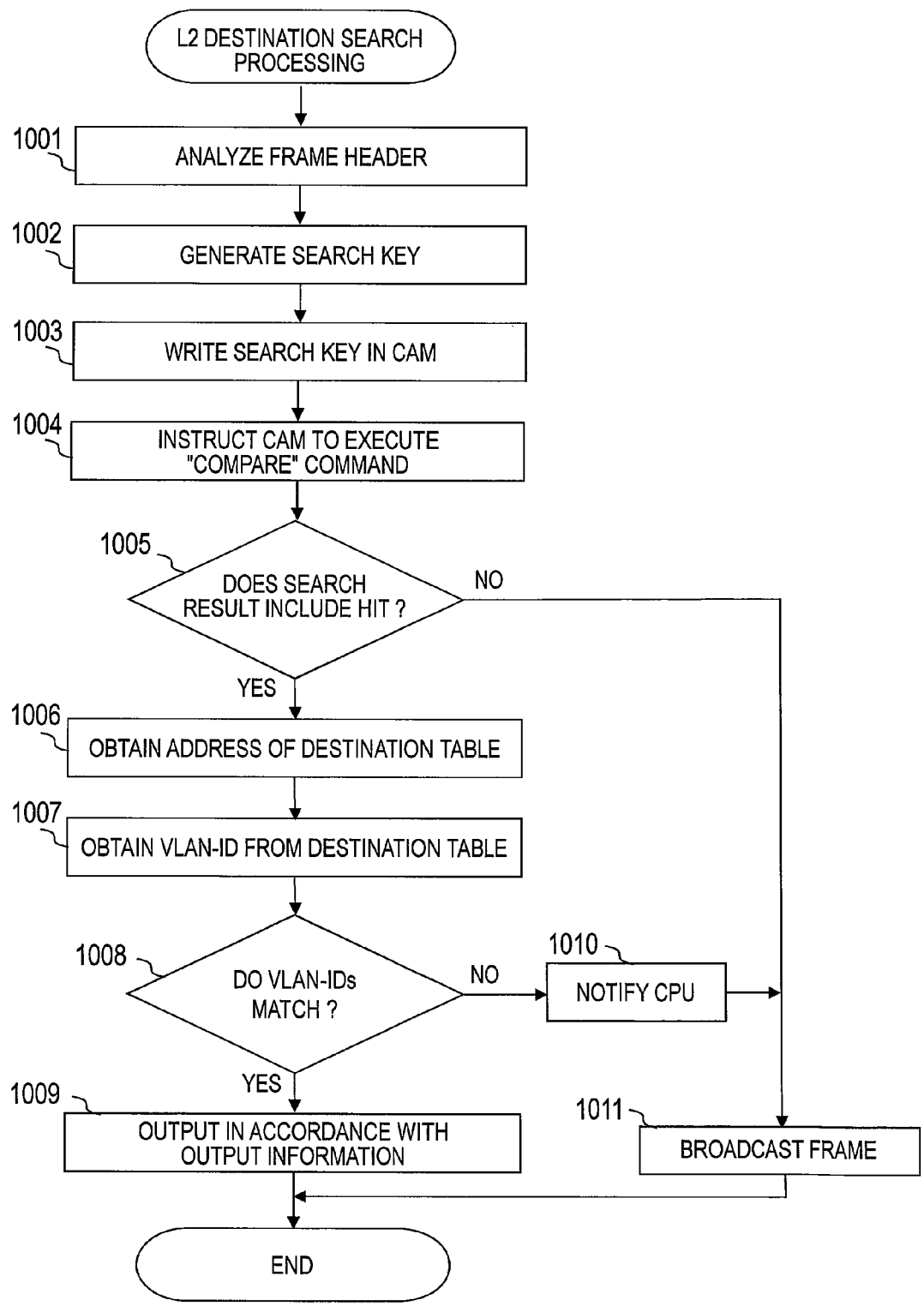
FIG. 10 is a flow chart illustrating L2 destination search processing which is executed by a search engine of the switch according to the second embodiment of this invention.

FIG. 10 is a flow chart illustrating L2 destination search processing which is executed by the search engine 132 of the switch 100 according to the second embodiment of this invention.

The frame transmitting/receiving circuit 131 receives a frame from one of the input ports 201 and outputs L2 header information of the frame to the search engine 132. The search engine 132 analyzes the header information input from the frame transmitting/receiving circuit 131 (Step 1001). This step is the same as Step 601 of FIG. 6.

The CAM search key generator 135 generates a search key for searching the CAM 133 from the input header information (Step 1002). The CAM search key generator 135 in the second embodiment generates a search key containing a VLAN-ID and a destination MAC address that are obtained from the input header information.

Next, the CAM search key generator 135 writes the search key generated in Step 1002 in the CAM 133 (Step 1003). The search key 704 of FIG. 7 is an example of the search key written in Step 1004.

Next, the search engine 132 transmits a "compare" command to the CAM 133, which uses the search key 704 to search the search table 138 (Step 1004). Specifically, the CAM 133 searches for an entry that contains the same search key 701 as the written search key 704, and obtains the value of the database entry 703 of a hit entry as a search result.

Next, the search result analyzer 203 determines whether or not the search in Step 1004 has hit on any entry of the search table 138 (Step 1005). In the case where the search has hit on any entry, the search intermediate table analyzer 204 searches the search intermediate table 206 by using, as a search key, the value of the database entry 703 that has been obtained as a search result, and obtains an address of the destination table 139 (namely, the table address 402) (Step 1006). The destination table analyzer 205 then searches the destination table 139 with the address obtained in Step 1006 as a search key, and obtains the VLAN-ID 803 from a hit entry (Step 1007).

Next, the verification information determining controller 137 determines whether or not the VLAN-ID 803 obtained in Step 1007 matches the VLAN-ID that is contained in the search key generated in Step 1002 (Step 1008). When these VLAN-IDs match, it is determined that an error has not occurred in at least the VLAN-ID section of the search key 701 hit in the search of Step 1004. The verification information determining controller 137 therefore inputs to the frame transmitting/receiving circuit 131 the output information 802 that is obtained from the entry hit in Step 1007, and the frame transmitting/receiving circuit 131 processes the frame in accordance with the output information 802 input thereto (Step 1009). Specifically, in the case where the output information 802 specifies one of the output ports 202, the frame transmitting/receiving circuit 131 outputs the frame from the specified output port 202.

When it is determined in Step 1008 that the VLAN-IDs do not match, it means that an error has occurred in the VLAN-ID section of the search key 701 of the entry hit in the search of Step 1004. In other words, if the frame is transmitted in accordance with the output information 802 that is obtained based on this search result, the frame arrives at a virtual network that is not the intended transmission destination, thereby giving rise to a security problem. The interface 130 therefore broadcasts the frame by using the result of a search of the flooding destination table 900 that is conducted with a VLAN-ID contained in the input search key 704 as a search key, instead of the output information 802 obtained in Step 1009 (Step 1011).

Specifically, the search engine 132 searches the flooding destination table 900 with a VLAN-ID contained in the input search key 704 as a search key, obtains the identifiers of all output ports 202 that are included in the output port 902 of a hit entry (i.e., an entry in which the value of the VLAN-ID 901 is the same as the VLAN-ID value of the search key), and inputs output information that contains these identifiers to the frame transmitting/receiving circuit 131. The frame transmitting/receiving circuit 131 outputs the frame from every output port 202 that is specified by the output information input thereto.

The interface 130 broadcasts the frame also when it is determined in Step 1005 that the search has not hit on any entry (Step 1011).

When it is determined in Step 1008 that the VLAN-IDs used as verification information do not match, the search engine 132 may notify the CPU 110 of the fact (Step 1010). Processing procedures executed by the CPU 110 and the search engine 132 when this notification is made are the same as the ones executed when the notification of Step 611 is made in the first embodiment, and a description thereof is omitted here. In the description of the processing procedures, Steps 605 to 612 of the first embodiment correspond to Steps 1004 to 1011 of the second embodiment, respectively.

A concrete example of the L2 destination search processing is described with reference to FIG. 4 and FIGS. 7 to 10. In the case where "00 • • • 1011 • • • 11" ("1011" out of this string corresponds to a VLAN-ID) is generated as a search key in Step 1002 and is written as the search key 704 in Step 1003, a value "0x0002" of the database entry 703 that is associated with a value "00 • • • 1011 • • • 11" of the search key 701 is obtained as a result of the execution of a "compare" command (Step 1004) by the CAM 133.

A value "6" of the table address 402 that is associated with a value "0x0002" of the address 401 is then obtained from the search intermediate table 206 (Step 1006). A value "output #7" of the output information 802 and a value "1011" of the VLAN-ID 803 that are associated with a value "0x0006" of the address 801 are obtained from the destination table 139 (Step 1007). Because no error has occurred in the CAM 133 in this example, the VLAN-ID "1011" matches the VLAN-ID that is contained in the search key generated in Step 1002 (Step 1008), and the frame is output in accordance with the output information "output #7" (Step 1009).

The search table 138 illustrated in FIG. 7 is one where no error has occurred. Now, a description is given on L2 destination search processing that is executed when an error in which the most significant bit and the second most significant bit in the VLAN-ID section are inverted turns a value "00 • • • 0111 • • • 11" of the search key 701 that is associated with a database entry value "0x0001" into "00 • • • 1011 • • • 11". In this case, a value "0x0001" of the database entry 703 that is associated with a value "00 • • • 1011 • • • 11" of the search key 701 is erroneously obtained as a result of executing the "compare" command (Step 1004).

Consequently, a value "5" of the table address 402 that is associated with a value "0x0001" of the address 401 is obtained from the search intermediate table 206 (Step 1006), and a value "output #6" of the output information 802 and a value "0111" of the VLAN-ID 803 that are associated with a value "0x0005" of the address 801 are obtained from the destination table 139 (Step 1007). The VLAN-ID "0111" does not match the VLAN-ID "1011" which is contained in the search key generated in Step 1002 (Step 1008), and the frame is therefore broadcast (Step 1011).

Specifically, the search engine 132 searches the flooding destination table 900 with the VLAN-ID "1011" which is contained in the search key generated in Step 1002 as a search key, and obtains values "port #9", "port #10", "port #11", and "port #12" of the output port 902 that are associated with a value "1011" of the VLAN-ID 901 which matches this search key. The search engine 132 then inputs to the frame transmitting/receiving circuit 131 output information that contains the output port identifiers obtained in the search of the flooding destination table 900, instead of the output information 802 obtained in the search of the destination table 139. The frame transmitting/receiving circuit 131 outputs the frame from the output ports 202 identified by the identifiers that are contained in the output information input thereto.

In the case where the generated search key is "00 • • • 1011 • • • 11" and there is no error in the search table 138 as described above, the frame is output in accordance with the output information "output #7". The output port 802A that is contained in the output information "output #7" in this case matches some or all of four output ports that are associated with the value "1011" of the VLAN-ID 901.

That the output port 802A contained in the output information "output #7" is part of the four output ports associated with the value "1011" of the VLAN-ID 901 means that actual output ports can be limited to some of the four output ports depending on other sections of the search key "00 • • • 1011 • • • 11" than the VLAN-ID "1011" (in other words, the frame associated with this search key does not need to be output from the remaining output ports). In such cases, too, if an error is found in the search table 138, the frame is output from all of the four output ports but, even then, every output frame arrives at a VLAN that is identified by the VLAN-ID "1011" and does not arrive at other VLANs. The security of the virtual networks is thus maintained.

In the second embodiment, an error that cannot be found by verification of VLAN-IDs occurs in the search table 138 in some cases as in the first embodiment. A patrol executed in the second embodiment in order to repair such errors is the same as the one described in the first embodiment, and a description thereof is omitted here.

According to the above-described second embodiment of this invention, where the switch 100 is an L2 switch, satisfactory error detection performance is accomplished in terms of errors in the CAM 133 without increasing the cost, and erroneous frame transfer is prevented as a result as in the first embodiment. In addition, erroneous transfer due to a hardware failure of the search function in the CAM 133 is prevented as well.

This invention is not limited to the embodiments described above, and encompasses various modification examples. The embodiments have described this invention in detail for the ease of understanding, and this invention is not necessarily limited to a mode that includes all of the configuration described above. A part of the configuration of one embodiment may be replaced with the configuration of another embodiment, and the configuration of one embodiment may be used in combination with the configuration of another embodiment. In each embodiment, another configuration may be added to, deleted from or replace a part of the configuration of the embodiment.

The components, functions, processing parts, processing measures, and the like described above may be implemented partially or entirely by hardware by, for example, designing the components and the like as an integrated circuit. The components, functions, and the like described above may also be implemented by software by interpreting and executing, with a processor, programs that implement the respective functions. The programs, tables, files, and other types of information for implementing the functions can be stored in a computer-readable non-transitory data storage medium such as a non-volatile semiconductor memory, or a hard disk drive, a solid state drive (SSD), or other storage device, or an IC card, an SD card, a DVD, or the like.

The drawings illustrate control lines and information lines that are regarded as necessary in describing the embodiments, and do not necessarily illustrate all of control lines and information lines included in actual products to which this invention is applied. It can be viewed that, in practice, almost all components are connected to one another.

What is claimed is:

1. A data transfer apparatus coupled to a network, comprising:
    a first memory;
    a second memory;
    a search unit which is connected to the first memory and the second memory; and
    a data transmitting/receiving unit which is connected to the search unit to process data received from the network,
    wherein the first memory holds information that associates a search key with an address,
    wherein the second memory holds information that associates the address with verification information which is generated by a predetermined generation method based on at least a portion of the search key,
    wherein the search unit is configured to:
        generate the search key based on the received data;
        obtain, from the first memory, the address that is associated with the generated search key;
        obtain, from the second memory, the verification information that is associated with the obtained address; and
        verify the verification information that is generated by the predetermined generation method based on at least a portion of the generated search key with the verification information obtained from the second memory, and
    wherein the data transmitting/receiving unit executes processing based on a result of the verification.

2. The data transfer apparatus according to claim 1,
    wherein the second memory holds information that associates the address and the verification information with output information comprising information that indicates an output destination of the received data,
    wherein the search unit is configured to:
        generate the search key that comprises, out of header information of a third layer of the OSI Reference Model that is comprised in the received data, at least a virtual network identifier of the third layer;
        generate the verification information by the predetermined generation method based on the virtual network identifier of the third layer that is comprised in the search key; and
        verify, with the verification information obtained from the second memory, the verification information that is generated by the predetermined generation method based on the virtual network identifier of the third layer that is comprised in the generated search key, and
    wherein the data transmitting/receiving unit is configured to:
        transmit, when the verification information that is generated by the predetermined generation method based on the virtual network identifier of the third layer that is comprised in the generated search key matches the verification information obtained from the second memory, the received data in accordance with the output information that is associated with the address; and
        discard the received data when the verification information that is generated by the predetermined generation method based on the virtual network identifier of the third layer that is comprised in the generated search key does not match the verification information obtained from the second memory.

3. The data transfer apparatus according to claim 2,
wherein the virtual network identifier of the third layer comprises a Virtual Routing and Forwarding identifier,
wherein the search unit generates a code by performing a predetermined calculation on the Virtual Routing and Forwarding identifier that is extracted from the search key, and
wherein the verification information comprises the generated code.

4. The data transfer apparatus according to claim 2,
wherein the virtual network identifier of the third layer comprises a Virtual Routing and Forwarding identifier,
wherein the search unit extracts the Virtual Routing and Forwarding identifier from the search key, and
wherein the verification information comprises the extracted Virtual Routing and Forwarding identifier.

5. The data transfer apparatus according to claim 1,
wherein the second memory holds information that associates the address and the verification information with output information comprising information that indicates an output destination of the received data,
wherein the second memory further holds information that associates a virtual network identifier of a second layer of the OSI Reference Model with the output destination of the received data,
wherein the search unit is configured to:
  generate the search key that comprises, out of header information of the second layer of the OSI Reference Model that is comprised in the received data, at least the virtual network identifier of the second layer;
  generate the verification information by the predetermined generation method based on the virtual network identifier of the second layer that is comprised in the search key; and
  verify, with the verification information obtained from the second memory, the verification information that is generated by the predetermined generation method based on the virtual network identifier of the second layer that is comprised in the generated search key, and
wherein the data transmitting/receiving unit is configured to:
  transmit, when the verification information that is generated by the predetermined generation method based on the virtual network identifier of the second layer that is comprised in the generated search key matches the verification information obtained from the second memory, the received data in accordance with the output information that is associated with the address; and
  transmit, when the verification information that is generated by the predetermined generation method based on the virtual network identifier of the second layer that is comprised in the generated search key does not match the verification information obtained from the second memory, the received data to every output destination associated with the virtual network identifier of the second layer that is obtained from the received data.

6. The data transfer apparatus according to claim 5,
wherein the virtual network identifier of the second layer comprises a virtual local area network identifier,
wherein the search unit generates a code by performing a predetermined calculation on the virtual local area network identifier that is extracted from the search key, and
wherein the verification information comprise the generated code.

7. The data transfer apparatus according to claim 5,
wherein the virtual network identifier of the second layer comprises a virtual local area network identifier,
wherein the search unit extracts the virtual local area network identifier from the search key, and
wherein the verification information comprises the extracted virtual local area network identifier.

8. The data transfer apparatus according to claim 1,
wherein the second memory holds:
  a first table including a plurality of entries, each of which comprises the verification information; and
  a second table in which, when the same verification information is generated by the predetermined generation method based on a plurality of different search keys, a plurality of addresses associated with the plurality of search keys are associated with one entry that comprises the same verification information.

9. The data transfer apparatus according to claim 1, further comprising a third memory for holding information that associates the search key with the address,
wherein the information held in the first memory is repaired at predetermined timing based on the information that is held in the third memory.

10. The data transfer apparatus according to claim 9,
wherein, when the verification information that is generated by the predetermined generation method based on at least a portion of the generated search key is verified with the verification information obtained from the second memory, and it is found as a result that the two do not match, information that is held in the first memory and that is associated with the generated search key is repaired based on the information that is held in the third memory.

11. The data transfer apparatus according to claim 10, wherein the first memory comprises a content-addressable memory, and the second memory and the third memory comprise random access memories.

12. A data transfer method to be executed by a data transfer apparatus coupled to a network,
the data transfer apparatus comprising:
  a first memory;
  a second memory;
  a search unit which is connected to the first memory and the second memory; and
  a data transmitting/receiving unit which is connected to the search unit to process data received from the network,
the first memory holding information that associates a search key with an address,
the second memory holding information that associates the address with verification information which is generated by a predetermined generation method based on at least a portion of the search key,
the data transfer method comprising:
  generating, by the search unit, the search key based on the received data;
  obtaining, by the search unit, the address that is associated with the generated search key from the first memory;
  obtaining, by the search unit, the verification information that is associated with the obtained address from the second memory;
  verifying, by the search unit, the verification information that is generated by the predetermined generation method based on at least a portion of the generated search key with the verification information obtained from the second memory; and executing, by the data transmitting/receiving unit, processing based on a result of the verification.

\* \* \* \* \*